United States Patent
Kim et al.

(10) Patent No.: US 6,877,131 B2
(45) Date of Patent: Apr. 5, 2005

(54) APPARATUS AND METHOD FOR GENERATING BLOCK CODE IN A MOBILE COMMUNICATION SYSTEM

(75) Inventors: Jae-Yoel Kim, Kunpo-shi (KR); Ho-Kyu Choi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 536 days.

(21) Appl. No.: 10/054,400

(22) Filed: Oct. 22, 2001

(65) Prior Publication Data

US 2002/0154618 A1 Oct. 24, 2002

(30) Foreign Application Priority Data

Oct. 21, 2000 (KR) ........................................ 2000-62084

(51) Int. Cl.[7] ............................................. H03M 13/00
(52) U.S. Cl. ..................................................... 714/790
(58) Field of Search ............................... 714/790, 786, 714/781, 793; 370/342; 375/147

(56) References Cited

PUBLICATIONS

Brouwer et al., An updated table of minimum–distance bounds for binary linear codes, Mar. 1993, IEEE Trans. on Info. Theory, vol. 39, No. 2, p. 662–677.*
Samsung Electronics Co., Ltd., Dynamic split mode for TFCI, Nov. 2000, TSG–RAN Working Group 1 meeting #17, TSGR1#17(00)1269, p. 1–5.*
Samsung, Test proposal regrading TFCI coding for TDD, Sep. 1999, TSG–RAN Working Group 1 neeting #7, TSRG1#7 (99)b61, p. 1–4.*

* cited by examiner

*Primary Examiner*—Albert Decady
*Assistant Examiner*—Shelly A Chase
(74) *Attorney, Agent, or Firm*—Dilworth & Barrese LLP

(57) ABSTRACT

An apparatus encodes 7 input bits into 24 symbols in a mobile communication system. In the apparatus, an encoder encodes 7 input bits into 32 symbols using an extended Reed-Muller code created from a Gold sequence, and a puncturer punctures 8 symbols from the 32 symbols provided from the encoder according to a predefined puncturing pattern, and outputs 24 non-punctured symbols.

22 Claims, 12 Drawing Sheets

US 6,877,131 B2

APPARATUS AND METHOD FOR GENERATING BLOCK CODE IN A MOBILE COMMUNICATION SYSTEM

PRIORITY

This application claims priority to an application entitled "Apparatus and method for Generating Block Code in a Mobile Communication System" filed in the Korean Industrial Property Office on Oct. 21, 2000 and assigned Serial No. 2000-62084, the contents of which are hereby incorporated by reference.

BACKGROUND OF THE INVENTION

1. Field of the Invention

The present invention relates generally to an apparatus and method for creating a block code in a mobile communication system, and in particular, to an apparatus and method for encoding a quality matching indicator (QMI) using a block code in a CDMA (Code Division Multiple Access) mobile communication system.

2. Description of the Related Art

In general, a CDMA mobile communication system (or an IMT-2000 system) transmits data frames of various services such as a voice service, an image service and a data service, using a single physical channel. Such service frames are multiplexed (combined) into one frame before transmission. In transmitting the multiplexed frame, a data rate of the respective data frames can be set to a different value in order to guarantee a quality of the respective services. When the respective service frames have different data rates, a transmitter must inform a receiver of the different data rates.

A quality matching indicator (QMI) serves to indicate information on the data rates of the respective service frames. It is important for the quality matching indicator to be correctly received at the receiver. Shown in FIG. 1 is an exemplary way to use the quality matching indicator.

FIG. 1 illustrates a structure of a forward link data traffic MAC channel (DTMACCH) for a packet data service in a mobile communication system supporting the high-speed data transmission. As illustrated, the minimum transmission unit of a physical layer for the packet data service is a 1,536-chip slot having duration of 1.25 msec. The data traffic MAC channel (DTMACCH) is comprised of a first channel (in-phase channel) and a second channel (quad-phase channel). The first channel, in-phase channel, is used as a QoS (or quality) matching indication channel, while the second channel, quad-phase channel, is used as a Walsh space indication subchannel (WSISCH) and a reverse activity indication subchannel (RAISCH). In one 1,536-chip slot, the WSISCH and the RAISCH have a 1,280 chip period and a 256-chip period, respectively. The WSISCH and the RAISCH are transmitted over the quad-phase channel of the DTMACCH after multiplexing.

FIG. 2 illustrates a transmitter for transmitting the quality matching indicator. Referring to FIG. 2, upon receiving a 7-bit quality matching indicator to be transmitted in one slot, a (24, 7) encoder 200 encodes the received 7 quality matching indicator bits and outputs 24 coded symbols having values of '0' and '1'. A signal mapper 210 or symbol encoder then maps the coded symbols from the encoder 200 by mapping '0' to '1' and '1' to '−1', and thus outputs symbols having values of '1' and '−1'. The 24 coded symbols output from the signal mapper 210 are provided to a multiplier 220 in a symbol unit, and at the same time, a Walsh cover (or Walsh code) of length 64 is provided to the multiplier 220. The multiplier 220 multiplies the respective symbols by the Walsh code of length 64. That is, the multiplier 220 outputs 64 chips upon receiving every symbol, thus outputting a total of 24×64=1,536 chips.

FIG. 3 illustrates a structure of a receiver operating in association with the transmitter of FIG. 2. Referring to FIG. 3, upon receiving an input signal, a symbol accumulator 320 despreads the received input signal by multiplying the signal by the same Walsh cover as used by the transmitter, and then accumulates the despread signal in a symbol unit. The symbols output from the symbol accumulator 320 are provided to a decoder 300 which corresponds to the encoder 200 of the transmitter. The decoder 300 decodes the symbols from the symbol accumulator 320 and outputs a 7-bit quality matching indicator.

As stated above, the quality matching indicator value is expressed with 7 bits. If the quality matching indicator, containing information required by the receiver in analyzing the respective service frames, has a transmission error, the receiver cannot correctly analyze the service frames. Therefore, the quality matching indicator should be encoded using an error correcting code such that even though a transmission error occurs during transmission of the quality matching indicator, the receiver can correct the transmission error.

In general, an error correction capability of binary linear codes is determined depending on a minimum distance between the binary linear codes. For the optimal code, the minimum distance $d_{min}$ between the optimal binary linear codes is disclosed in a reference entitled "An Updated Table of Minimum-Distance Bounds for Binary Linear Codes" (A. E. Brouwer and Tom Verhoeff, IEEE Transactions on information Theory, VOL 39, NO. 2, MARCH 1993).

Considering that the quality matching indicator transmitted by the transmitter of FIG. 2 is a (24, 7) code having 7 input bits and 24 output coded symbols, the minimum distance between required optimal codes is $d_{min}=10$ as described in the above-stated reference document. If an encoder for encoding the quality matching indicator fails to satisfy the minimum distance $d_{min}=10$, an error rate of the quality matching indicator increases in the same channel environment. Therefore, an error of the quality matching indicator occurs, so that the receiver may incorrectly recognize the data rates of the service frames, causing an increase in frame error rate during demodulation of the service frames. Therefore, it is most important for an error correcting encoder for correcting the quality matching indicator to minimize the error rate.

SUMMARY OF THE INVENTION

It is, therefore, an object of the present invention to provide an apparatus and method for creating a (24, 7) code.

It is another object of the present invention to provide an apparatus and method for encoding a quality matching indicator indicating a data rate of respective service frames in a mobile communication system supporting high-speed data transmission.

It is further another object of the present invention to provide optimal puncturing positions used in performing puncturing on a (32, 7) code created using a Reed-Muller code so as to create a 24-symbol sequence.

To achieve the above and other objects, there is provided an apparatus for encoding 7 input bits into 24 symbols in a mobile communication system. In the apparatus, an encoder encodes 7 input bits into 32 symbols using an extended Reed-Muller code created from a Gold sequence, and a puncturer punctures 8 symbols from the 32 symbols provided from the encoder according to a predefined puncturing pattern, and outputs 24 non-punctured symbols. The predefined puncturing pattern is selected from the group of puncturing patterns given below, {0, 1, 3, 7, 10, 13, 15, 18}
{0, 1, 3, 7, 10, 13, 15, 25}
{0, 4, 13, 18, 20, 25, 29, 31}
{0, 1, 3, 7, 10, 11, 13, 16}
{0, 3, 10, 11, 13, 15, 26, 31}

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The mobile communication system using a quality matching indicator according to the present invention employs an encoder for creating an optimal code by puncturing an extended Reed-Muller code in encoding the quality matching indicator.

Commonly, a measure, i.e., a parameter indicating performance of a linear error correcting code, includes distribution of a Hamming distance of a codeword of an error correcting code. The Hamming distance refers to the number of non-zero symbols in the respective codewords. That is, for a codeword '0111', the number of 1's included in this codeword, i.e., the Hamming distance is 3. The least value among the Hamming distance values of several codewords is called a "minimum distance $d_{min}$". The linear error correcting code has superior error correcting performance (or capability), as the minimum distance is increased more and more.

Figure 1:
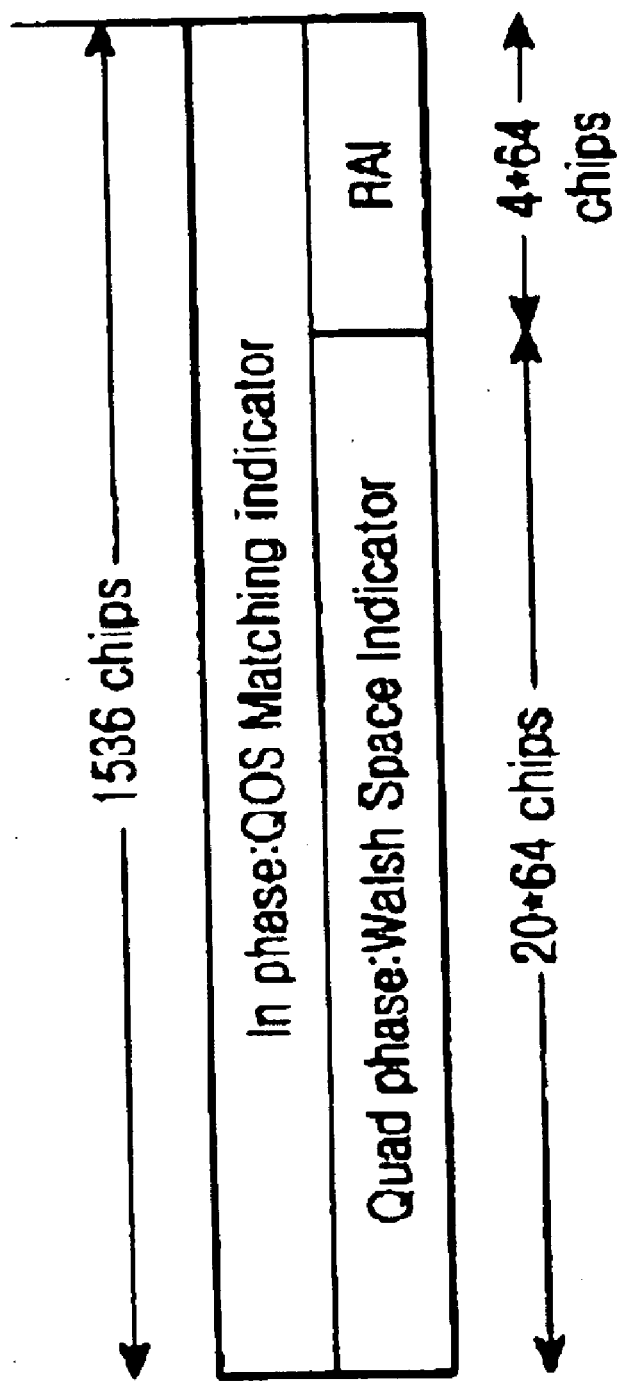
FIG. 1 is a diagram illustrating how to use a quality matching indicator in a CDMA mobile communication system.
Figure 2:
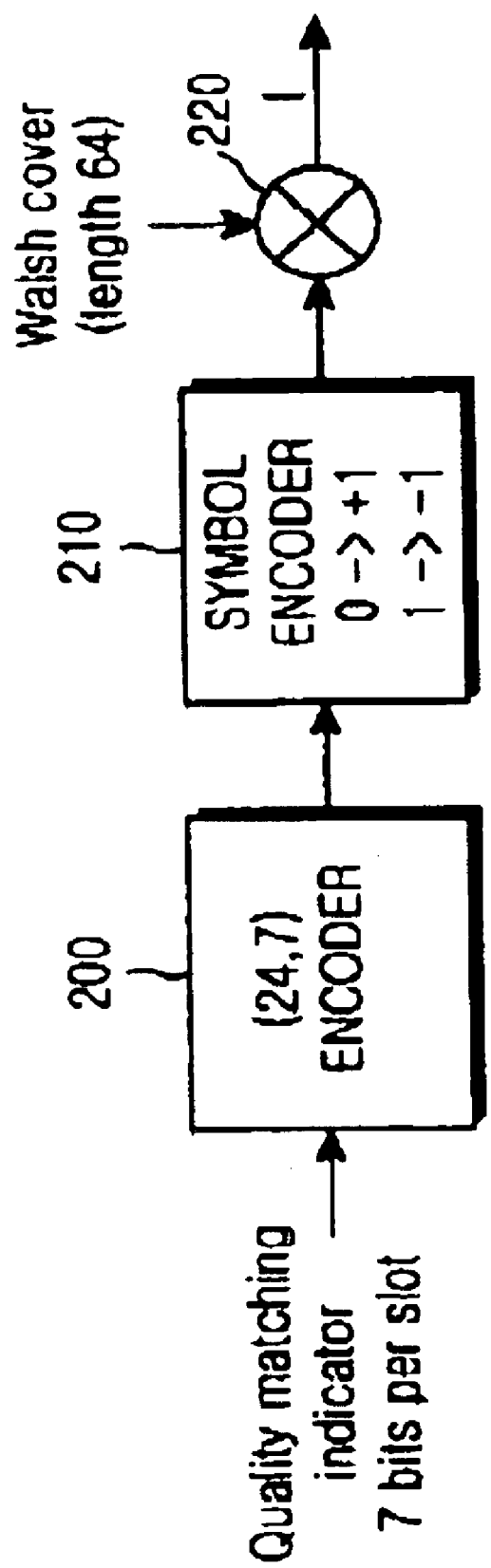
FIG. 2 is a diagram illustrating a structure of a transmitter for transmitting the quality matching indicator.
Figure 3:
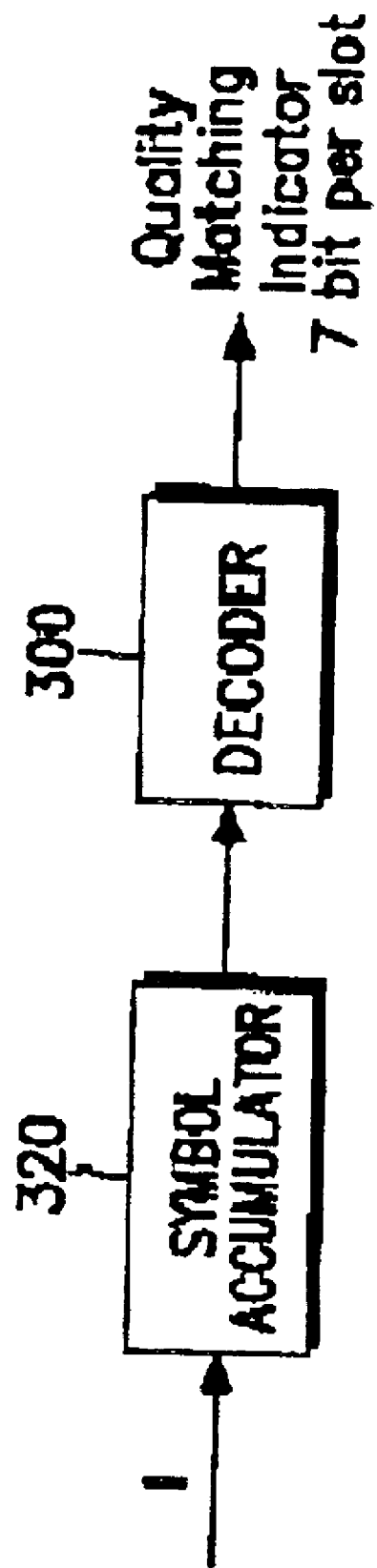
FIG. 3 is a diagram illustrating a structure of a receiver operating in association with the transmitter of FIG. 2.
Figure 4:
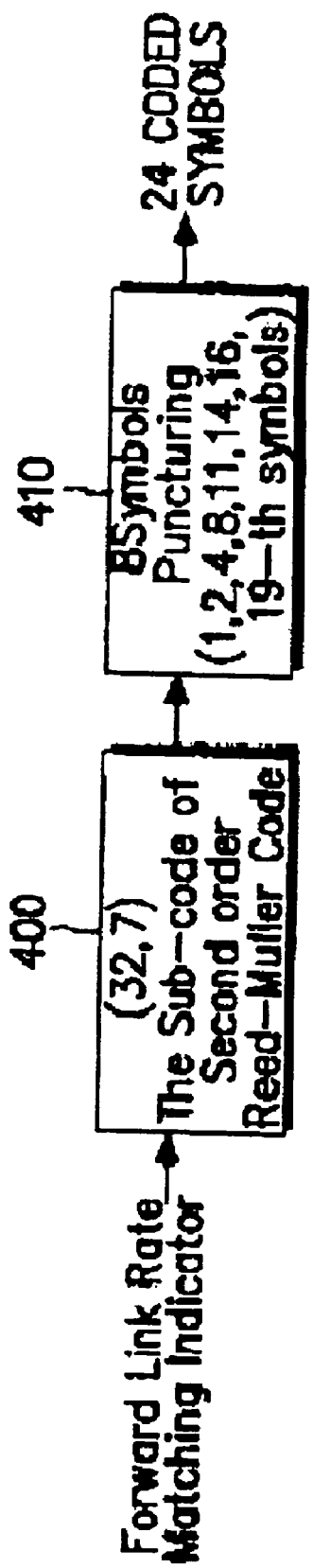
FIG. 4 is a diagram illustrating a scheme for encoding a 7-bit quality matching indicator (QMI) into 24 symbols using an error correcting code according to an embodiment of the present invention.

FIG. 4 illustrates a scheme for encoding a 7-bit quality matching indicator (QMI) into 24 symbols using an error correcting code according to an embodiment of the present invention. Being comprised of 7 bits, the quality matching indicator has a value between 1 and 128.

Referring to FIG. 4, an extended Reed-Muller encoder 400 encodes a received 7-bit QMI into a 32-symbol QMI codeword. A puncturer 410 punctures 8 coded symbols from the 32-symbol QMI codeword from the extended Reed-Muller encoder 400. Here, input information bits constitute the 7-bit quality matching indicator. If the number of the input information bits is less than 7, the QMI is filled with a value of '0' beginning at the MSB (Most Significant Bit, or the leftmost bit) to make the 7-bit QMI, before encoding.

The extended Reed-Muller code can be derived from a sequence determined by the sum (or XOR) of a specific sequence and an m-sequence. In order to use a sequence family (or group) including the sum of the sequences as its elements, the sequence family must have a large minimum distance. Such sequence family includes a Kasami sequence family, a Gold sequence family and a Kerdock code family. Such sequences have a minimum distance of $(2^{2m}-2^m)/2$ for the full length $L=2^{2m}$, and a minimum distance of $2^{2m}-2^m$ for the full distance $L=2^{2m+1}$. That is, the minimum distance is 12 for the full length 32.

Now, a description will be made regarding a method for creating an extended error correcting code which is a linear error correcting code having high performance, using the above stated sequence families.

Figure 5:
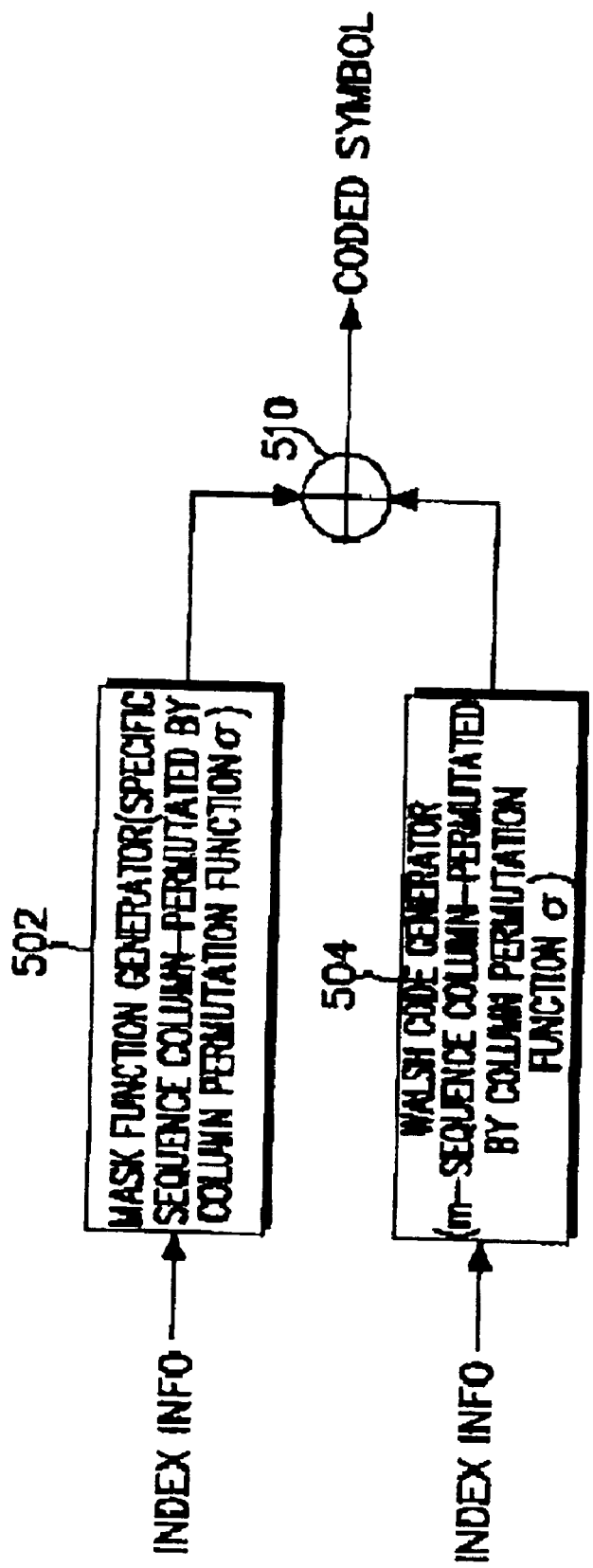
FIG. 5 is a diagram illustrating a scheme for encoding a linear error correcting code according to an embodiment of the present invention.

According to a coding theory, there exists a column permutation function for creating a Walsh code by cyclic-shifting the m-sequence. The m-sequence becomes a Walsh code when the sequences comprised of the specific sequence and the m-sequence are subjected to column permutation using the column permutation function. The minimum distance by the sum (XOR) of the specific sequence and the Walsh code satisfies the optimal code property. Herein, a sequence obtained by column-permutating the specific sequence will be referred to as a "mask function (or mask sequence)." FIG. 5 illustrates a detailed structure of the encoder 400 shown in FIG. 4. As illustrated, the present invention provides a QMI encoding scheme for making a complete coded symbol (or QMI codeword) by adding a first coded symbol (or mask function) created by a first QMI bit and a second coded symbol (or orthogonal code) created by a second QMI bit.

Referring to FIG. 5, QMI bits to be transmitted are divided into a first QMI bit and a second QMI bit and then, provided to a mask function generator 502 and a Walsh code generator 504, respectively. The mask function generator 504 outputs a given mask sequence by encoding the first QMI bit, and the Walsh code generator 504 outputs a given orthogonal sequence by encoding the second QMI bit. An adder 510 then adds (XORs) the mask sequence from the mask function generator 502 and the orthogonal sequence from the orthogonal code generator 504, and outputs a complete QMI codeword (or QMI coded symbol). The mask function generator 502 may have mask sequences associated with every set of the first QMI bits in the form of a coding table. The orthogonal code generator 504 may also have orthogonal sequences associated with every set of the second QMI bits in the form of a coding table.

Now, a description will be made of a method for creating the mask functions (or mask sequences) in the case where a ($2^n$,n+k) code is created using the Gold sequence family. Here, the "($2^n$,n+k) code" refers to a code for outputting a QMI codeword (or coded symbol) comprised of $2^n$ symbols by receiving (n+k) QMI bits (input information bits). Actually, it is known that the Gold sequence is represented by the sum of different m-sequences. Therefore, in order to create the ($2^n$,n+k) code, a Gold sequence of length $2^n-1$ must be created first. The Gold sequence is equivalent to the sum of two m-sequences created by generator polynomials f1(x) and f2(x). In addition, if the generator polynomial is determined, the respective m-sequences m(t), i.e., $m_1(t)$ and $m_2(t)$ can be calculated using a trace function in accordance with Equation (1).

$$m_1(t) = Tr(A\alpha^t), t = 0, 1, \ldots, 30 \quad \text{Equation (1)}$$

$$\text{where, } Tr(\alpha) = \sum_{k=0}^{n-1} \alpha^{2^k}, \alpha \in GF(2^n)$$

In Equation (1), A indicates a value determined according to an initial value of the m-sequence, α indicates a root of the generator polynomial, and n indicates the degree of the generator polynomial.

Figure 6:
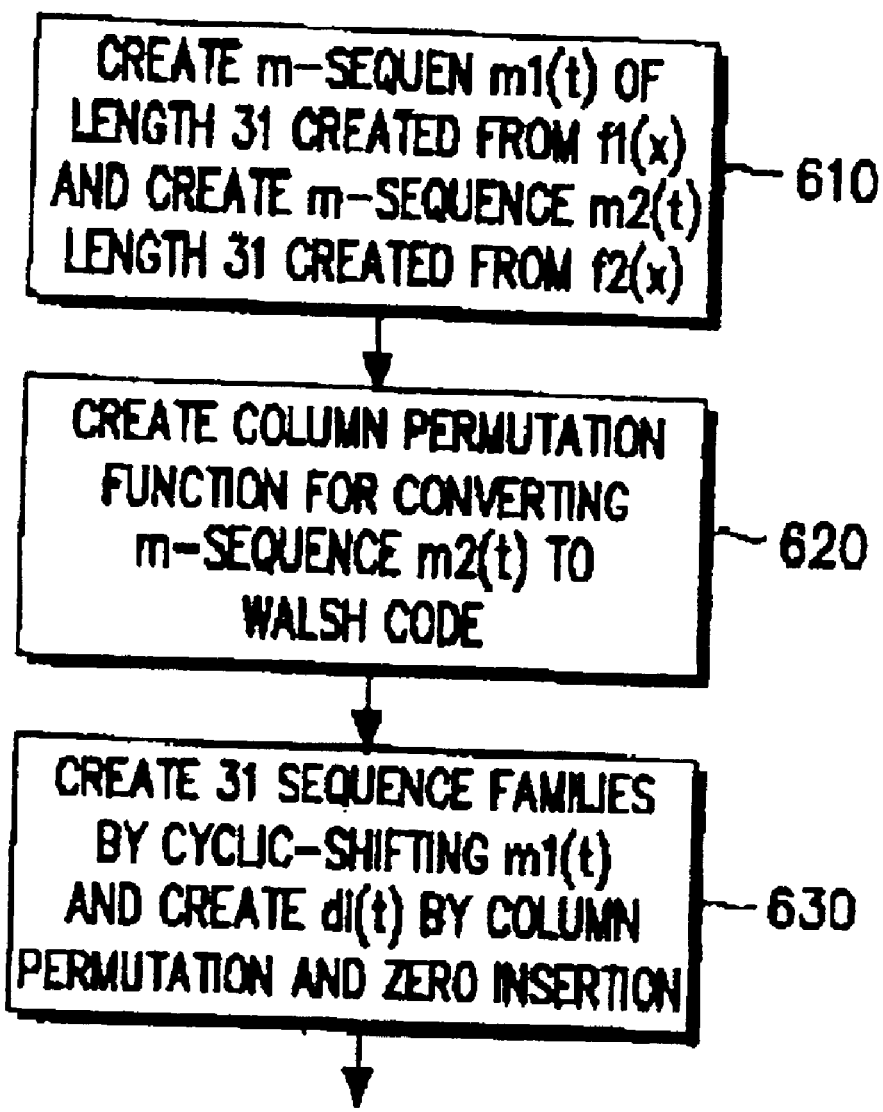
FIG. 6 is a flow chart illustrating a procedure for creating a mask function using a Gold sequence family according to an embodiment of the present invention.

FIG. 6 illustrates a procedure for creating the mask function in the case where the ($2^n$,n+k) code (i.e., a code for outputting a $2^n$-bit coded symbol by receiving (n+k) input information bits) is created using the Gold sequence among the above-mentioned sequences. It is known that the Gold sequence is represented by the sum of the different m-sequences. Therefore, in order to create the ($2^n$,n+k) code, a Gold sequence of length $2^n-1$ must be created first. The Gold sequence, as described above, is created by the sum of the two m-sequences created by generator polynomials f1(x) and f2(x).

Referring to FIG. 6, in step 610, an m-sequence $m_1(t)$ created by the generator polynomial f1(x) and a sequence $m_2(t)$ created by the generator polynomial f2(x) are calculated in accordance with Equation (1). In step 620, a column permutation function σ(t) for converting the m-sequence $m_1(t)$ into a Walsh code shown in Equation (2) is calculated.

$$\sigma: \{0, 1, 2, \ldots, 2^n - 2\} \rightarrow \{1, 2, \ldots, 2^n - 1\} \quad \text{Equation (2)}$$

$$\sigma(t) = \sum_{i=0}^{n-1} m_1(t) 2^{n-1-i}$$

In step 630, 7 sequence families obtained by cyclic-shifting the m-sequence $m_2(t)$ 0 to 30 times are subjected to column permutation using $\sigma^{31}{}^{-1}(t)+2$, where $\sigma^{-1}(t)$ is an inverse function of the column permutation function σ(t) for converting the sequence $m_1(t)$ to the Walsh code. Further, '0' is added to the head of every sequence created by the column permutation so as to make the sequences have a length $2^n$, thereby creating ($2^n-1$) sequence families $d_i(t)$ of length $2^n$, where i=0, ..., $2^n-1$ and t=1, ..., $2^n$. The sequence families created in step 630 can be represented by Equation (3).

$$\{d_i(t) \mid t = 1, \ldots, 2^n, i = 0, \ldots, 2^n - 2\} \quad \text{Equation (3)}$$

$$d_i(t) = \begin{pmatrix} 0, & \text{if } t = 1 \\ m_d(t + i - 2), & \text{if } t = 2, 3, \ldots, 2^n \end{pmatrix}$$

The calculated sequence families $d_i(t)$ are mask functions which can be used as 31 masks.

One of the properties of the calculated sequence families $d_i(t)$ is that a mask created by adding two different masks out of the above masks becomes another mask out of the ($2^n-1$) masks. To generalize further, all of the ($2^n-1$) masks including a mask of all 0's can be represented by a predefined sum of n masks out of the ($2^n-1$) masks. The n masks are defined as basis sequences.

The total number of codewords required in creating the ($2^n$,n+k) code is $2^{n+k}$ which is the number of possible sets of the input information bits. Here, the number of orthogonal sequences of length $2^n$ is $2^n$, and the number of non-zero masks required to create the ($2^n$,n+k) code is ($2^{n+k}/2^n$)-1= $2^k-1$. In addition, the ($2^k-1$) masks can also be represented by a predefined sum of the k masks on the basis of the property similar to that described above.

Next, a method for selecting the k masks will be described. In step 630, a sequence family is created by cyclic-shifting the $m_1(t)$ 0 to $2^{(n/2)-1}$ times. An m-sequence created by cyclic-shifting the $m_1(t)$ i times can be expressed as $Tr(\alpha^i \cdot \alpha^t)$ using Equation (1). That is, a sequence family created by cyclic-shifting the $m_1(t)$ 0 to 30 times include the sequences created according to initial values A=1, α, ..., $\alpha^{2n-2}$. At this moment, k linearly independent basis elements are searched from the Galois elements 1, α, ..., $\alpha^{2n-2}$. The sequences corresponding to the output sequences of the trace function taking the k basis elements as initial values become basis mask sequences. In this process, the linearly independent condition is represented by Equation (4).

$$\alpha_1, \ldots, \alpha_{k-1}: \text{ linearly independent} \quad \text{Equation (4)}$$

$$\Leftrightarrow c_1 \alpha_1 + c_2 \alpha_2 + \cdots + c_{k-1} \alpha_{k-1} \neq 0,$$

$$\forall c_1, c_2, \ldots, c_{k-1}$$

A method for creating the generalized mask function will be described with reference to FIG. 6, for the case where a (32, 7) code is created using the Gold sequence family. Actually, it is well known that the Gold sequence is represented by the sum of the different m-sequences. Therefore, in order to create the (32, 7) code, a Gold sequence of length 31 must be created first. The Gold sequence is created by the sum of two m-sequence created by a generator polynomial $x^5+x^2+1$ and a generator polynomial $x^5+x^4+x^2+x+1$. Here, if the generator polynomials are determined, each m-sequence m(t) can be calculated using the trace function as shown in Equation (5).

$$m_1(t) = Tr(A\alpha^t), t = 0, 1, \ldots, 63 \quad \text{Equation (5)}$$

$$\text{where, } Tr(\alpha) = \sum_{n=0}^{4} \alpha^{2^n}, \alpha \in GF(2^5)$$

In Equation (5), A indicates a value determined according to an initial value of the m-sequence and α indicates a root of the generator polynomial. In addition, n=5 because the generator polynomial is of the $6^{th}$ degree.

FIG. 6 illustrates a procedure for creating the mask function in the case where the (32, 7) code (i.e., a code for outputting a 32-bit coded symbol by receiving 7 input information bits) is created using a Gold sequence family among the above-stated sequence families. Referring to FIG. 6, in step 610, an m-sequence $m_1(t)$ created by the generator polynomial $x^5+x^2+1$ and an m-sequence $m_2(t)$ created by the generator polynomial $x^5+x^4+x^2+x+1$. In step 620, a column permutation function $\sigma(t)$ for converting the m-sequence $m_1(t)$ into a Walsh code shown in Equation (6) is calculated.

$$\sigma: \{0, 1, 2, \ldots, 30\} \to \{1, 2, \ldots, 31\} \quad \text{(Equation 6)}$$

$$\sigma(t) = \sum_{i=0}^{4} m_2(t) 2^{4-i}$$

In step 630, 31 sequence families obtained by cyclic-shifting the m-sequence $m_2(t)$ 0 to 30 times are subjected to column permutation using $\sigma^{-1}(t)+2$, where $\sigma^{-1}(t)$ is an inverse function of the column permutation function $\sigma(t)$ for converting the sequence $m_1(t)$ to the Walsh code. Further, '0' is added to the head of every column-permutated sequence, thereby creating 32 sequence families $d_i(t)$ of length 32, where i=0, ..., 31 and t=1, ..., 32. The sequence families created in step 630 can be represented by Equation (7).

$$\{d_i(t) \mid t = 1, \ldots, 32, i = 0, \ldots, 31\} \quad \text{Equation (7)}$$

$$d_i(t) = \begin{pmatrix} 0, & \text{if } t = 1 \\ m_d(t + i - 2), & \text{if } t = 2, 3, \ldots, 32 \end{pmatrix}$$

The sequence families $d_i(t)$ calculated by Equation (7) are mask functions which can be used as 31 mask sequences.

One of the properties of the calculated sequence families $d_i(t)$ is that a mask created by adding two different masks out of the above masks becomes another mask out of the 31 masks. To generalize further, all of the 31 masks can be represented by a predefined sum of 5 masks out of the 31 masks. As mentioned above, all of the mask sequences which can be represented by the predefined sum of the masks, are defined as basis sequences.

The total number of codewords required in creating the (32, 7) code is $2^7=128$, which is the number of possible sets of the input information bits. Here, the number of orthogonal codewords of length 32 is 64×2=128, and the number of masks required to create the (32, 7) code is (128/32)−1=3. In addition, all of the 3 masks can also be represented by a predefined sum of the 2 masks on the basis of the property similar to that described above. Therefore, a method for selecting the 2 masks is required. The method for selecting the 2 masks will be described below. In step 630, a sequence family is created by cyclic-shifting the $m_2(t)$ 0 to 31 times. An m-sequence created by cyclic-shifting the $m_2(t)$ i times can be expressed as $\text{Tr}(\alpha^i \cdot \alpha^t)$ using Equation (1). That is, a sequence family created by cyclic-shifting the $m_1(t)$ 0 to 31 times include the sequences created according to initial values A=1, $\alpha$, ..., $\alpha^{30}$. At this moment, 2 linearly independent basis elements are searched from the Galois elements 1, $\alpha$, ..., $\alpha^{30}$. It is possible to create all 3 masks by the predefined sum of the 2 mask sequences by selecting the sequences taking the 2 basis elements as initial values. In this process, the linearly independent condition is represented by Equation (8).

$$\alpha, \beta, \gamma, \delta: \text{linearly independent} \Leftrightarrow c_1\alpha + c_2\beta + c_3\gamma + c_4\delta \neq 0, \forall c_1, c_2, c_3, c_4 \quad \text{Equation (8)}$$

Actually, 1 and $\alpha$ in the Galois field $GF(2^3)$ are basis polynomials well known as the above 2 linear independent elements. Therefore, the following 2 mask functions M1 and M2 are calculated by substituting the basis polynomials into Equation (1)

M1=0010 1000 0110 0011 1111 0000 0111 0111

M2=0000 0001 1100 1101 0110 1101 1100 0111

Now, a detailed description will be made regarding an apparatus and method for encoding and decoding the quality matching indicator in a CDMA mobile communication system according to an embodiment of the present invention. In the embodiments of the present invention, the encoder and the decoder use the basis mask sequences calculated in the above method.

First Embodiment

Figure 7A:
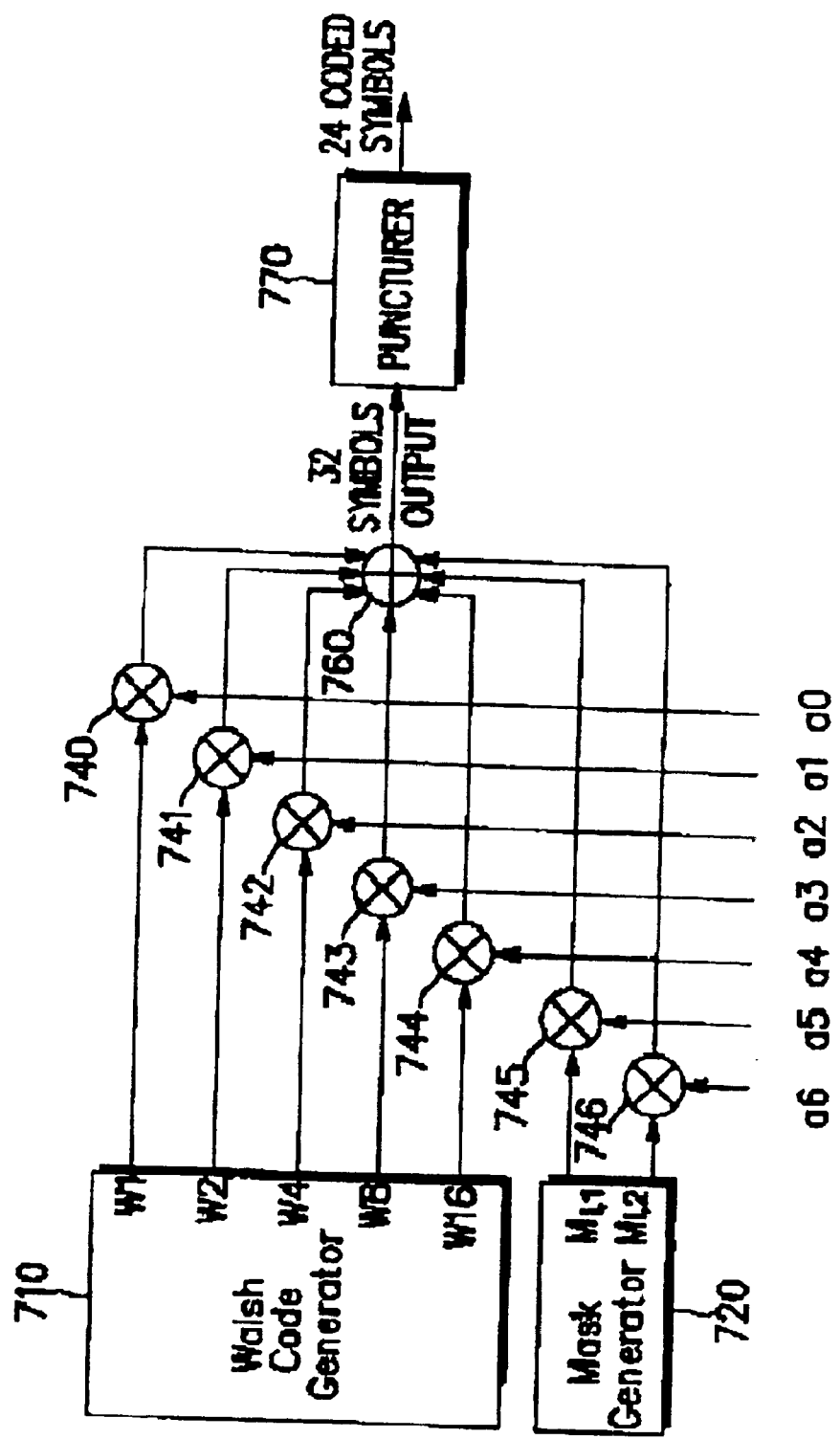
FIG. 7A is a diagram illustrating an apparatus for encoding a quality matching indicator according to a first embodiment of the present invention.

FIG. 7A illustrates an apparatus for encoding a quality matching indicator (QMI) in a CDMA mobile communication system according to a first embodiment of the present invention. Referring to FIG. 7A, 7 input information bits a0–a6 are provided to their associated multipliers 740–746, respectively. A basis Walsh code generator 710 generates basis Walsh codes having a predetermined length. Here, the "basis Walsh codes" refer to predetermined Walsh codes, by a predetermined sum of which all desired Walsh codes can be created. For example, for a Walsh code of length 32, the basis Walsh codes include a $1^{st}$ Walsh code W1, a $2^{nd}$ Walsh code W2, a $4^{th}$ Walsh code W4, an $8^{th}$ Walsh code W8 and a $16^{th}$ Walsh code W16.

The Walsh code generator 710 simultaneously outputs Walsh codes W1, W2, W4, W8 and W16 of length 32. The multiplier 740 multiplies the $1^{st}$ Walsh code W1 (=01010101010101010101010101010101) from the Walsh code generator 710 by the first input information bit a0. The multiplier 741 multiplies the $2^{nd}$ Walsh code W2 (=00110011001100110011001100110011) from the Walsh code generator 710 by the second input information bit a1. The multiplier 742 multiplies the $4^{th}$ Walsh code W4 (=00001111000011110000111100001111) from the Walsh code generator 710 by the third input information bit a2. The multiplier 743 multiplies the $8^{th}$ Walsh code W8 (=00000000111111110000000011111111) from the Walsh code generator 710 by the fourth input information bit a3. The multiplier 744 multiplies the $16^{th}$ Walsh code W16 (=00000000000000001111111111111111) from the Walsh code generator 710 by the fifth input information bit a4. That is, the multipliers 740–744 multiply the input basis Walsh codes W1, W2, W4, W8 and W16 by their associated input information bits a0–a4 in a symbol unit.

A mask generator 720 generates mask sequences having a predetermined length. The method for generating the mask sequences will not be described, since it has already been described above. For example, when the (32, 7) code is generated using the Gold sequence, the basis mask sequences include a $1^{st}$ mask sequence M1 and a $2^{nd}$ mask sequence M2. The mask generator 720 simultaneously outputs the mask functions M1 and M2 of length 32. The multiplier 745 multiplies the $1^{st}$ mask function M1 (=0010 1000 0110 0011 1111 0000 0111 0111) from the mask generator 720 by the input information bit a5. The multiplier 746 multiplies the $2^{nd}$ mask function M2 (=0000 0001 1100 1101 0110 1101 1100 0111) from the mask generator 720 by the input information bit a6. The multipliers 745 and 746 multiply the input basis mask sequences M1 and M2 by the associated input information bits a5 and a6 in a symbol unit.

An adder 760 adds (or XORs) the symbols output from the multipliers 740–746 in a symbol unit, and then, outputs 32 coded symbols. A symbol puncturer 770 punctures the 32 symbols output from the adder 760 according to a predetermined rule and outputs 24 non-punctured symbols. That is, the (24, 7) encoder punctures 8 symbols from the 32 symbols created by the (32, 7) code. The minimum distance of the (24, 7) encoder varies depending on the positions of the 8 punctured symbols. Combinations of the 8 punctured positions, providing superior performance, are shown in Table 1. When using the following combinations of the punctured positions, the (32, 7) encoder has the minimum distance of 9 and provides superior weight distribution.

TABLE 1

Pattern #1 : 0, 1, 3, 7,10,13,15,18
Pattern #2; 0, 1, 3, 7, 10, 13, 15, 25
Pattern #3: 0, 4, 13, 18, 20, 25, 29, 31
Pattern #4: 0, 1, 3, 7, 10, 11, 13, 16
Pattern #5: 0, 3, 10, 11, 13, 15, 26, 31

Figure 8:
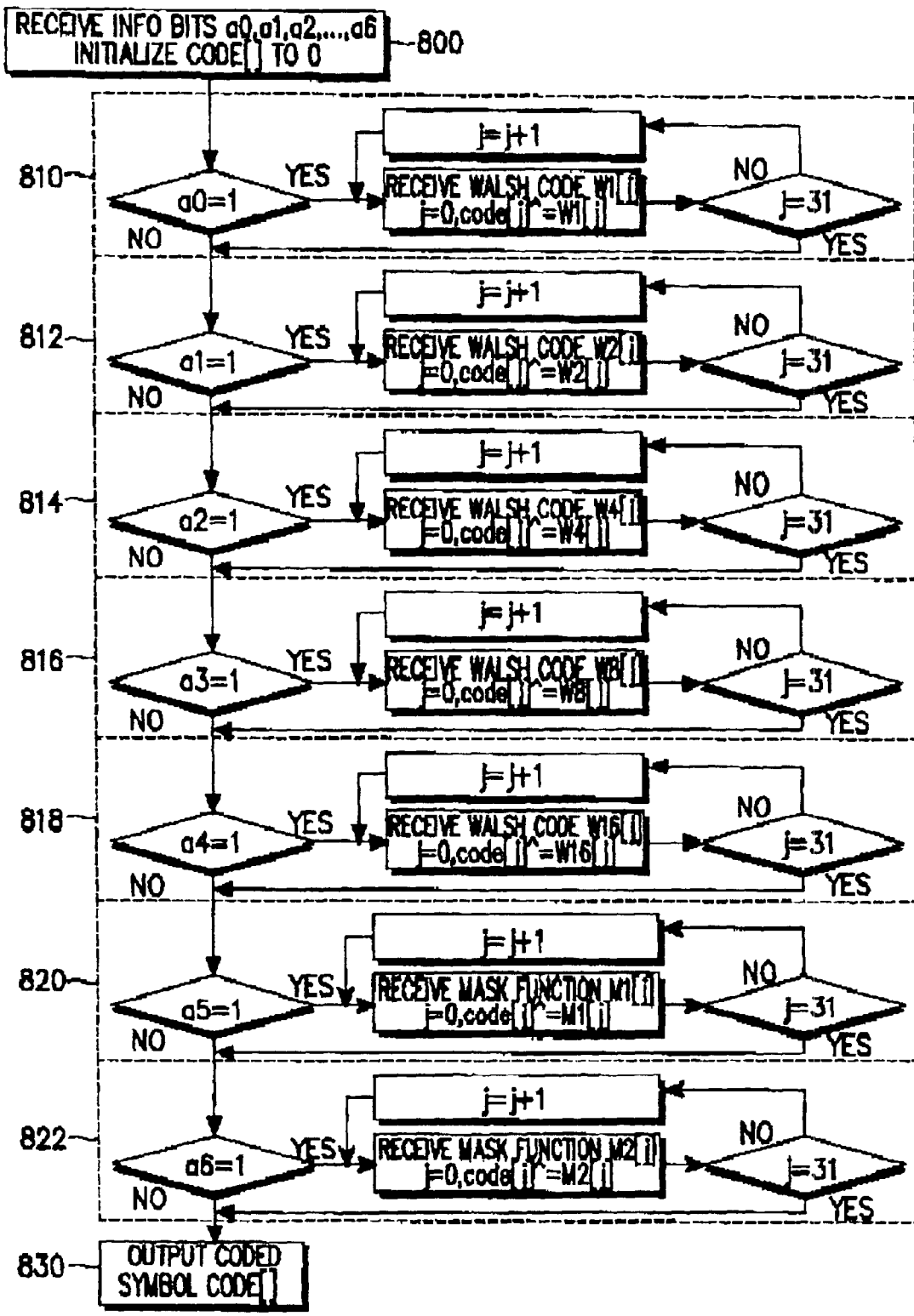
FIG. 8 is a flow chart illustrating an operation performed by the encoder of FIG. 7A.

FIG. 8 illustrates a control flow for encoding a quality matching indicator (QMI) in a CDMA mobile communication system according to the first embodiment of the present invention. Referring to FIG. 8, in step 800, a sequence of 7 input information bits a0–a6 is input and then, parameters code[ ] and j are initialized to '0'. The parameter code[ ] indicates the 32 coded symbols finally output from the encoder and the parameter j is used to count the 32 symbols constituting one codeword.

Thereafter, it is determined in step 810 whether the first information bit a0 is '1'. If the first information bit a0 is '1', the $1^{st}$ Walsh code W1 (=01010101010101010101010 1010101) is XORed with the coded symbol sequence parameter code[ ] of length 32 in a symbol unit. Otherwise, if the first information bit a0 is not '1', the control flow skips to step 812. After step 810, it is determined in step 812 whether the second information bit a1 is '1'. If the second information bit a1 is '1', the $2^{nd}$ Walsh code W2 (=00110011001100110011001100110011) is XORed with the coded symbol sequence parameter code[ ] of length 32 in a symbol unit. Otherwise, if the second information bit a1 is not '1', the control flow skips to step 814. After step 812, it is determined in step 814 whether the third information bit a2 is '1'. If the third information bit a2 is '1', the $4^{th}$ Walsh code W4(=00001111000011110000111100001111) is XORed with the coded symbol sequence parameter code[ ] of length 32. Otherwise, if the third information bit a2 is not '1', the control flow skips to step 816. After step 814, it is determined in step 816 whether the fourth information bit a3 is '1'. If the fourth information bit a3 is '1', the $8^{th}$ Walsh code W8 (=00000000111111110000000011111111) is XORed with the coded symbol sequence parameter code[ ] of length 32. Otherwise, if the fourth information bit a3 is not '1', the control flow skips to step 818. After step 816, it is determined in step 818 whether the fifth information bit a4 is '1'. If the fifth information bit a4 is '1', the $16^{th}$ Walsh code W16(=0000000000000000 1111111111111111) is XORed with the coded symbol sequence parameter code[ ] of length 32. Otherwise, if the fifth information bit a4 is not '1', the control flow skips to step 820. More specifically, if the fifth information bit a4 is '1', the parameter j is initialized to '0' and a $j^{th}$ symbol among 32 symbols of a parameter code[j] is XORed with a sixth information bit of '1'. Further, it is determined whether the parameter j is 31, in order to determine whether the parameter j is the last symbol of the codeword. If the parameter j is not 31, this process is repeated after increasing the parameter j by 1. In other words, in step 818, when the information bit a4 is '1', a length-32 sequence of all 1's is XORed with a coded symbol sequence of length 32. If the parameter j is 31, the control flow proceeds to step 820.

After step 818, it is determined in step 820 whether the sixth information bit a5 is '1'. If the information bit a5 is '1', the first mask function M1 (=0010 1000 0110 0011 1111 0000 0111 0111) is XORed with the coded symbol sequence parameter code[ ] of length 32. Otherwise, if the information bit a5 is not '1', the control flow skips to step 822. After step 820, it is determined in step 822 whether the seventh information bit a6 is '1'. If the information bit a6 is '1', the second mask function M2 (=0000 0001 1100 1101 0110 1101 1100 0111) is XORed with the coded symbol sequence parameter code[ ] of length 32. Otherwise, if the information bit a6 is not '1', the control flow skips to step 824. In step 824, only the sequences corresponding to information bits 1's out of the 7 sequences W1, W2, W4, W8, W16, M1 and M2 of length 32 associated respectively with the 7 input information bits a0–a6 are all XORed to output a value of the coded symbol sequence parameter code[ ].

Figure 9:
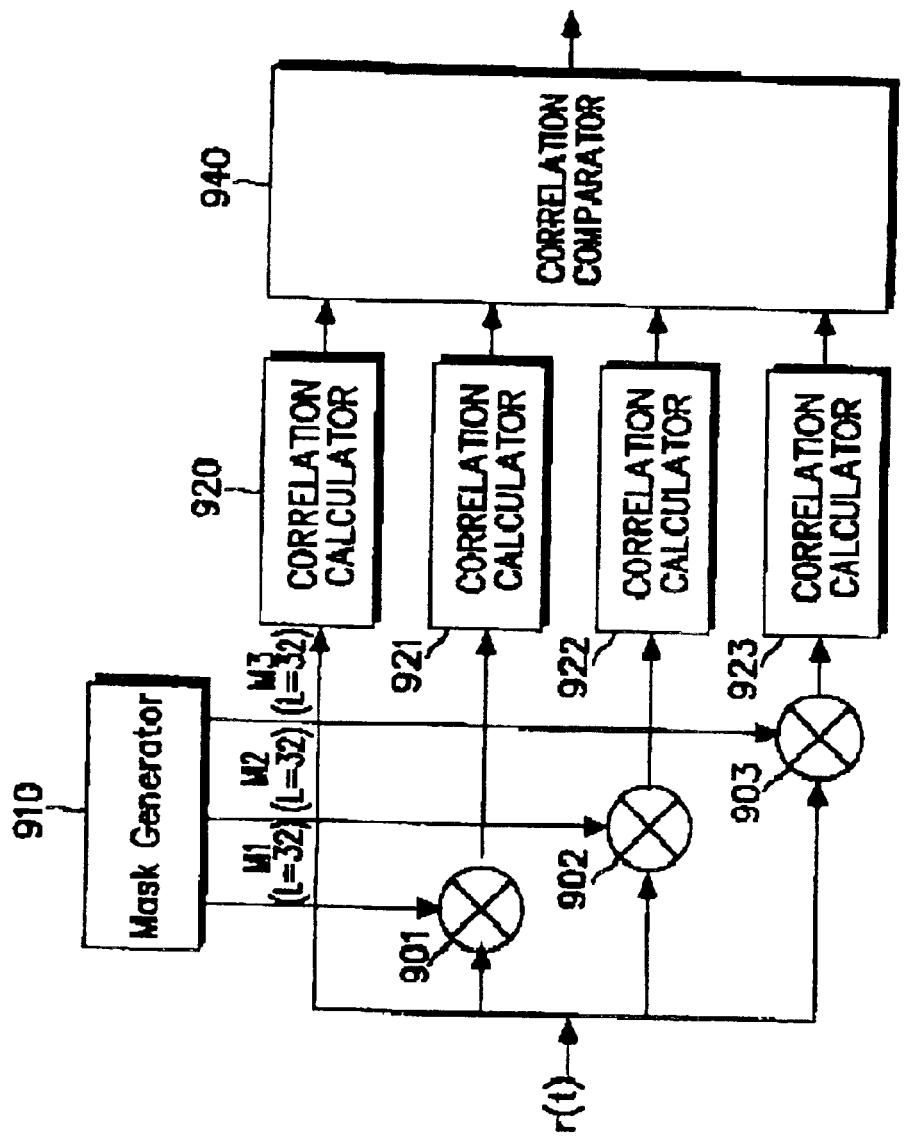
FIG. 9 is a diagram illustrating an apparatus for decoding a quality matching indicator according to an embodiment of the present invention.

FIG. 9 illustrates a decoder operating in association with the encoder of FIG. 7A according to an embodiment of the present invention. Referring to FIG. 9, the decoder inserts '0' in the positions, punctured by the encoder, of a received signal corresponding to the QMI symbol of length of 24, having a value of +1/−1, thereby to create a received signal r(t) of length 32. The received signal r(t) is provided to 3 multipliers 901–903 and a correlation calculator 920. The received signal r(t) is a signal encoded by a predetermined Walsh code and a predetermined mask sequence in the encoder of the transmitter. A mask generator 910 creates possible mask functions M1–M3 which can be created by 2 basis masks, and provides the generated mask functions to the multipliers 901–903, respectively. The multiplier 901 multiplies the received signal r(t) by the mask function M1 output from the mask generator 910, and provides its output to a correlation calculator 921. The multiplier 902 multiplies the received signal r(t) by the mask function M2 output from the mask generator 910, and provides its output to a correlation calculator 922. The multiplier 903 multiplies the received signal r(t) by the mask function M3 output from the mask generator 910, and provides its output to a correlation calculator 923. That is, the multipliers 901–903 multiply the received signal r(t) by their associated mask functions M1–M3 from the mask generator 910, and provide their outputs to the associated correlation calculators 921–923, respectively. By doing so, the received signal r(t) and the signals calculated by multiplying the received signal r(t) by the possible 3 mask functions, i.e., a total of 4 signals are provided to the 4 correlation calculators 920–923, respectively. If the transmitter has encoded the QMI using a predetermined mask function, any one of the outputs from the multipliers 901–903 will be a mask function-removed signal. Then, the correlation calculators 920–923 calculate 32 correlation values by correlating the received signal r(t) and the outputs of the multipliers 901–903 with 32 Walsh codes of length 32. The largest one of the calculated correlation values, an index of then-correlated Walsh code and an index of the correlation calculator are provided to a correlation comparator 940. The 32 Walsh codes have already been defined above. The correlation calculator 920 calculates 32 correlation values by correlating the received signal r(t) with 32 Walsh codes of length 32. Further, the correlation calculator 920 provides the correlation comparator 940 with the largest one of the calculated correlation values, an index of then-calculated Walsh code and an index '0' of the correlation calculator 920. Here, the index of the correlation calculator is equivalent to an index of the mask function indicating which mask function is multiplied by the received signal for the signal input to the correlation calculator. However, the mask index '0' means that no mask is multiplied by the received signal. Further, the correlation calculator 921 also calculates 32 correlation values by correlating the received signal r(t) multiplied by the mask function M1 by the multiplier 901 with 32 Walsh codes of length 32. Further, the correlation calculator 921 provides the correlation comparator 940 with the largest one of the calculated correlation values, an index of then-calculated Walsh code and an index '1' of the correlation calculator 921. The correlation calculator 922 calculates 32 correlation values by correlating the received signal r(t) multiplied by the mask function M2 by the multiplier 902 with 32 Walsh codes of length 32. Further, the correlation calculator 922 provides the correlation comparator 940 with the largest one of the 32 calculated correlation values, an index of then-calculated Walsh code and an index '2' of the correlation calculator 922. The correlation calculator 923 calculates 32 correlation values by correlating the received signal r(t) multiplied by the mask function M3 by the multiplier 907 with 32 Walsh codes of length 32. Further, the correlation calculator 923 provides the correlation comparator 940 with the largest one of the calculated correlation values, an index of then-calculated Walsh code and an index '3' of the correlation calculator 923.

The correlation comparator 940 then compares the 4 largest correlation values provided from the correlation calculators 920–923, and determines the largest one of them. After determining the largest correlation value, the correlation comparator 940 outputs QMI information bits transmitted from the transmitter according to the index of the Walsh code provided from the correlation calculator associated with the determined correlation value and an index (or mask index) of the same correlation calculator. That is, the correlation comparator 940 determines a decoded signal of the received signal using the index of the Walsh code and the index of the mask function.

Figure 10:
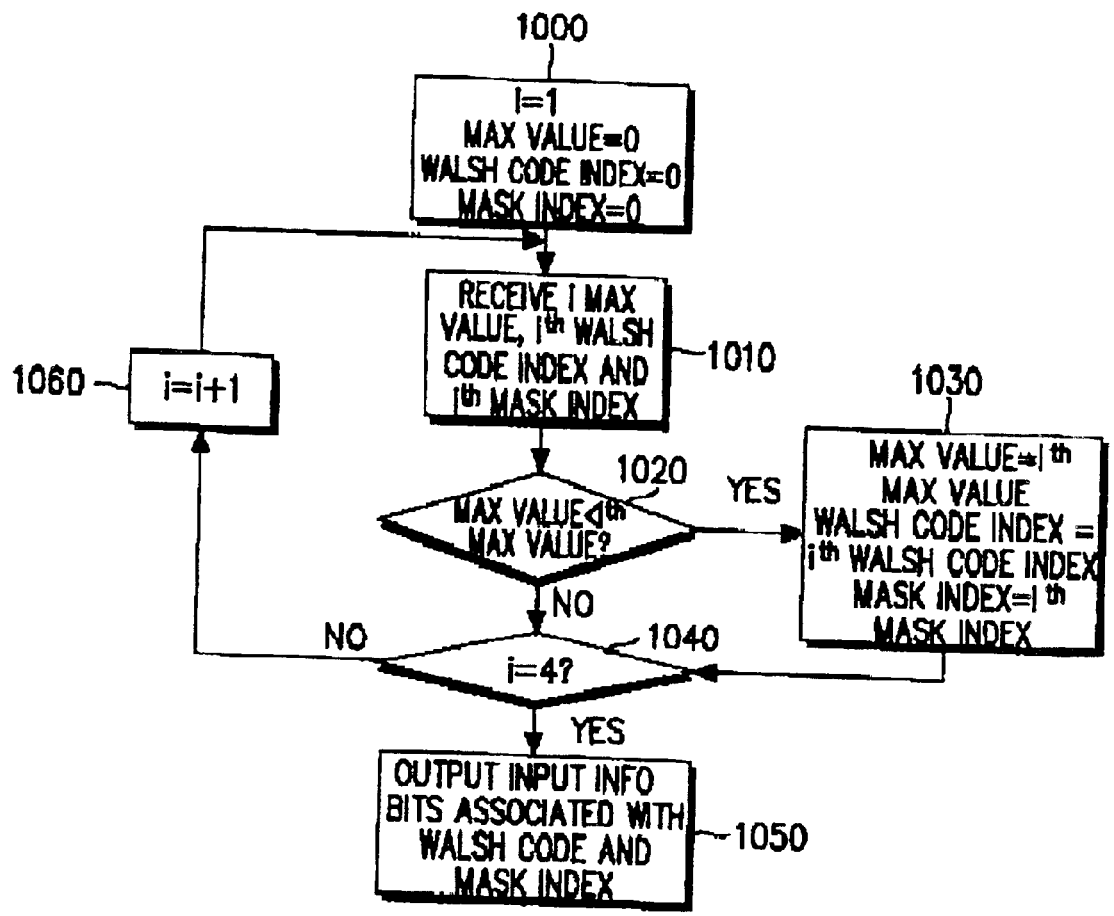
FIG. 10 is a flow chart illustrating an operation performed by the comparator shown in FIG. 9.

FIG. 10 illustrates a procedure for determining a Walsh code index and a mask function index for the largest correlation value by comparing the 4 correlation values in the correlation comparator 940 according to the first embodiment of the present invention, and outputting the QMI information bits accordingly. Referring to FIG. 10, in step 1000, a frequency indication index parameter i is initialized to 1, and a maximum value, a Walsh code index and a mask index are all initialized to '0'. In step 1010, the correlation value, the Walsh code index for the correlation value and the mask index, output from the first correlation calculator 920, are stored as a first maximum value, a first Walsh code index and a first mask sequence index, respectively. Thereafter, in step 1020, the first maximum value is compared with a previously stored maximum value. If the first maximum value is larger than the previously stored maximum value, the procedure goes to step 1030. Otherwise, if the first maximum value is smaller than or equal to the previously stored maximum value, the procedure proceeds to step 1040. In step 1030, the first maximum value is designated as the maximum value, and the first Walsh code index and the first mask index are designated as the Walsh code index and the mask index, respectively. In step 1040, a value set for the index parameter i is compared with the number '4' of the correlation calculators, in order to determine whether comparison has been completely performed on all of the 4 correlation values. If the frequency indicating index i is not equal to the number '4' of the correlation calculators in step 1040, the correlation comparator 940 increases the frequency indicating index i by 1 in step 1060 and thereafter, returns to step 1010 to repeat the above-described process using the $i^{th}$ maximum value, the $i^{th}$ Walsh code index and the $i^{th}$ mask index, output from the increased $i^{th}$ correlation calculator. After the above process is repeatedly performed on the $4^{th}$ maximum value, the $4^{th}$ Walsh code index and the $8^{th}$ mask index, the frequency indicating index i becomes 4. Then, the procedure goes to step 1050. In step 1050, the correlation comparator 940 outputs decoded bits (QMI information bits) associated with the Walsh code index and the mask index. The Walsh code index and the mask index corresponding to the decoded bits are the Walsh code index and the mask index corresponding to the largest one of the 4 correlation values provided from the 4 correlation calculators.

In the first embodiment, the (24, 7) encoder punctures 8 symbols from the 32 created codes, thereby outputting 24 non-punctured symbols. In the second embodiment below, however, unlike FIG. 7A, the encoder outputs 24 symbols after puncturing 8 symbols according to a predetermined puncturing pattern in the Walsh code generator and the mask generator.

Second Embodiment

The encoding apparatus according to the second embodiment of the present invention is similar in structure to the encoder described with reference to the first embodiment. However, the only difference is that the sequences output from the Walsh code generator and the mask generator are the sequences of length 24, to which a puncturing pattern is previously applied. For example, the sequences output from the Walsh code generator and the mask generator according to the first embodiment, from which $0^{th}$, $1^{st}$, $3^{rd}$, $7^{th}$, $10^{th}$, $13^{th}$, $15^{th}$ and $18^{th}$ terms are punctured, are used in the second embodiment.

Figure 7B:
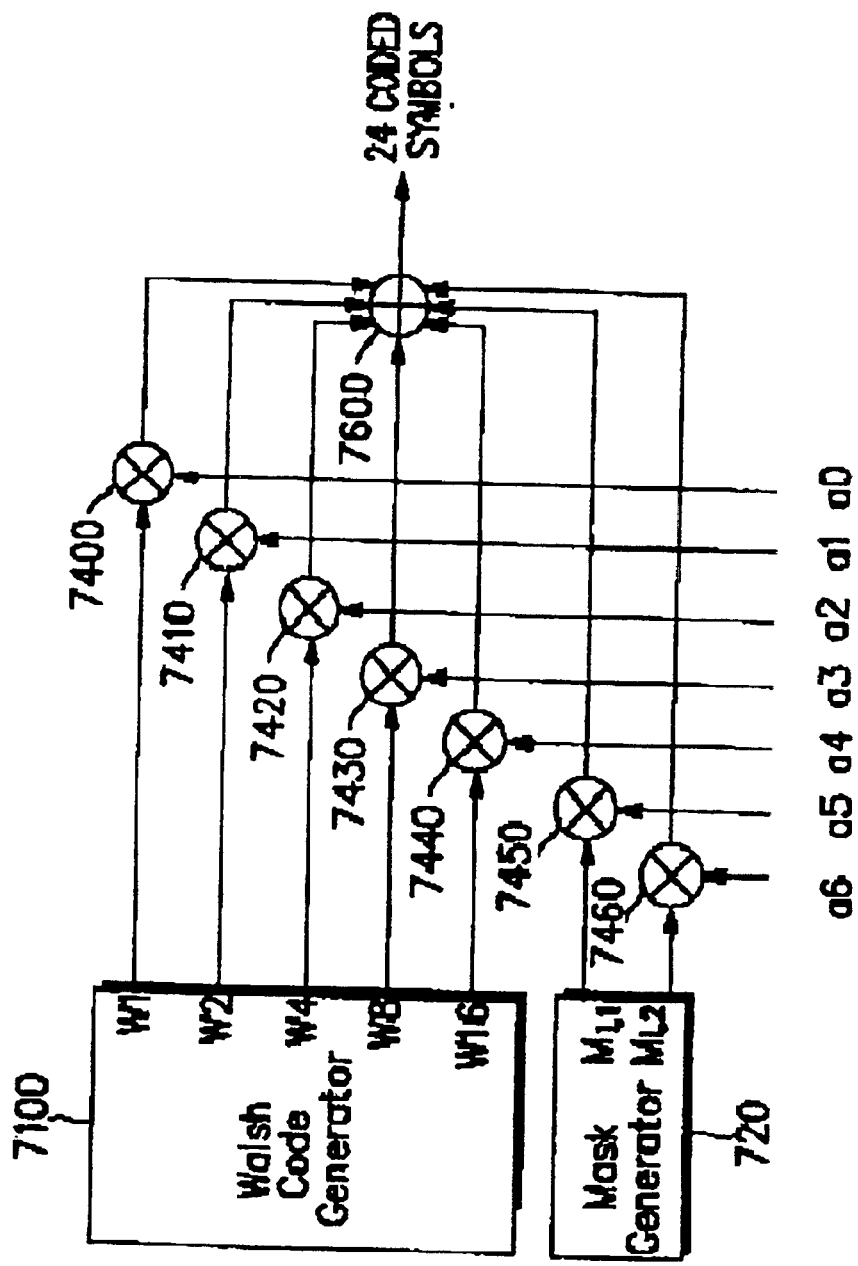
FIG. 7B is a diagram illustrating an apparatus for encoding a quality matching indicator according to a second embodiment of the present invention.

FIG. 7B illustrates an apparatus for encoding a quality matching indicator (QMI) in a CDMA mobile communication system according to the second embodiment of the present. invention. Referring to FIG. 7B, 7 input information bits a0–6 are provided to their associated multipliers 7400, 7410, 7420, 7430, 7440, 7450 and 7460, respectively. A basis Walsh code generator 7100 simultaneously generates Walsh codes W1', W2', W4', W8' and W16' of length 24, calculated by puncturing the basis Walsh codes according to a predetermined puncturing rule as described above. Here, the "basis Walsh codes" refer to predetermined Walsh codes, by a predetermined sum of which all of desired Walsh codes can be created. For example, for a Walsh code of length 32, the basis Walsh codes include a $1^{st}$ Walsh code W1, a $2^{nd}$ Walsh code W2, a $4^{th}$ Walsh code W4, an $8^{th}$ Walsh code W8 and a $16^{th}$ Walsh code W16. The multiplier 7400 multiplies the Walsh code W1' (=0010 0110 0011 0101 0101 0101) punctured according to a predetermined puncturing rule by the Walsh code generator 7100 by the input information bit a0. The multiplier 7410 multiplies the punctured Walsh code W2' (=1001 0010 1001 0011 0011 0011) from the Walsh code generator 7100 by the input information bit a1. The multiplier 7420 multiplies the punctured Walsh code W4' (=0111 0001 1000 1111 0000 1111) from the Walsh code generator 7100 by the input information bit 2. The multiplier 7430 multiplies the punctured Walsh code W8' (=0000 1111 1000 0000 1111 1111) from the Walsh code generator 7100 by the input information bit a3. The multiplier 7440 multiplies the punctured Walsh code W16' (=0000 0000 0111 1111 1111 1111) from the Walsh code generator 7100 by the input information bit a4.

A mask generator 7200 simultaneously outputs punctured basis mask functions M1' and M2' of length 24, determined by puncturing the basis masks according to a predetermined puncturing pattern. The method for creating the mask functions will not be described, since it has already been described above. The multiplier 7450 multiplies the punctured mask function M1' (=1100 0100 1111 0000 0111 0111) from the mask generator 7200 by the input information bit a5. The multiplier 7460 multiplies the punctured mask function M2' (=0000 1101 0010 1101 1100 0111) from the mask generator 7200 by the input information bit a6. That is, the multipliers 7450 and 7640 multiply the input basis mask sequences M1' and M2' by the associated input information bits a5 and a6 in a symbol unit. An adder 7600 then adds (or XORs) the symbols output from the multipliers 7400–7460 in a symbol unit, and outputs 24 coded symbols (QMI symbols).

Figure 11:
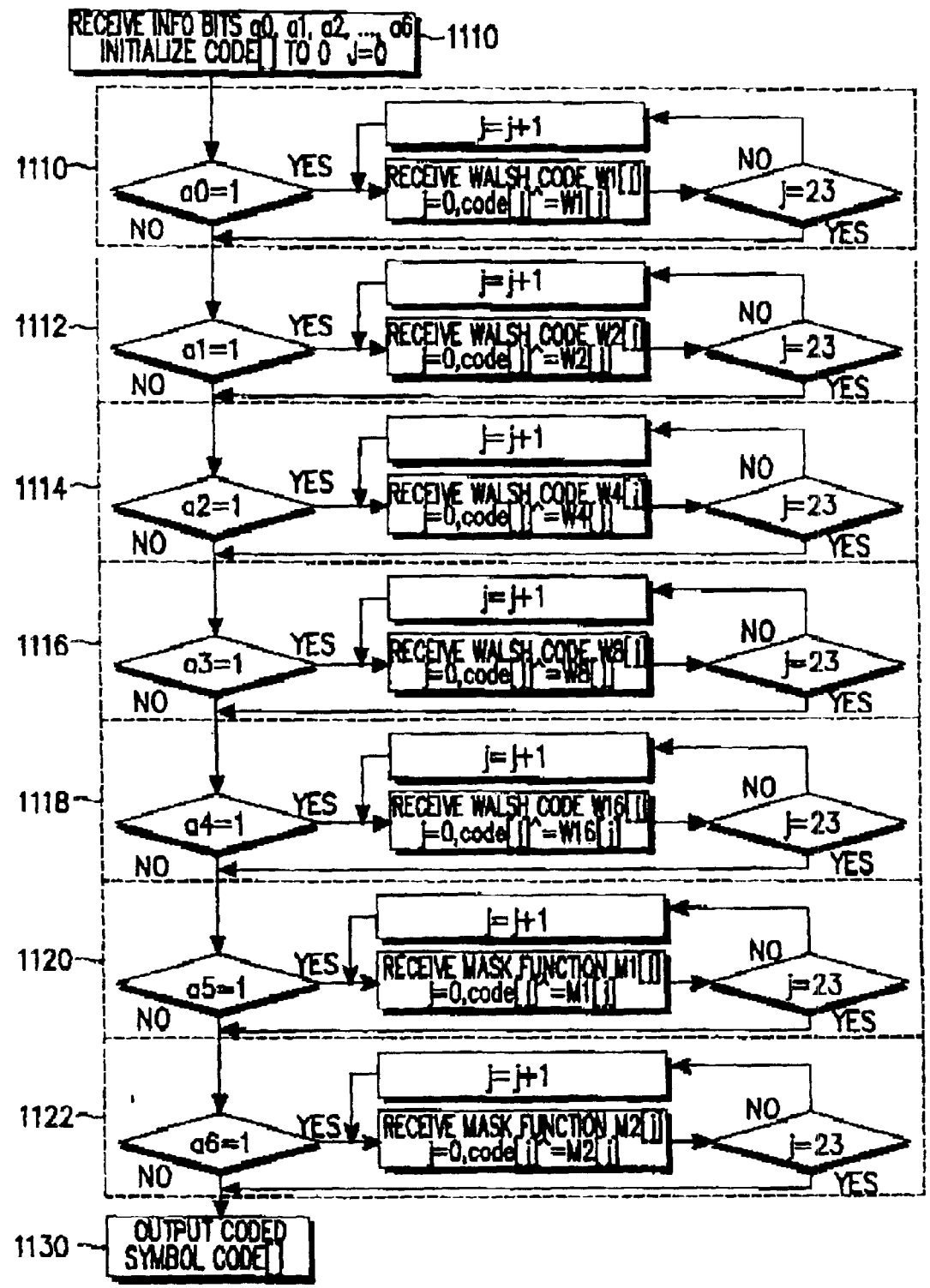
FIG. 11 is a flow chart illustrating an operation performed by the encoder of FIG. 7B.

FIG. 11 illustrates a control flow for encoding a quality matching indicator (QMI) in a CDMA mobile communication system according to the second embodiment of the present invention. Referring to FIG. 11, in step 1100, a sequence of 7 input information bits a0–a6 is received and then, parameters code[ ] and j are initialized to '0'. Here, the coded symbol sequence parameter code[ ] indicates the 24 coded symbols finally output from the encoder and the parameter j is used to count the 24 coded symbols constituting one codeword. Thereafter, it is determined in step 1110 whether the first information bit a0 is '1'. If the first information bit a0 is '1', the punctured basis Walsh code W1' (=0010 0110 0011 0101 0101 0101) is XORed with the coded symbol sequence parameter code[ ] in a symbol unit. Otherwise, if the first information bit a0 is not '1', the control flow skips to step 1112.

More specifically, if the information bit a0 is '1', the parameter j is initialized to '0' and a $j^{th}$ symbol of the first punctured Walsh code W1' is XORed with a $j^{th}$ position code[j] of the coded symbol sequence parameter. Here, since j=0, the $j^{th}$ symbol of the first Walsh code is XORed with the $0^{th}$ position of the coded symbol sequence parameter. Further, it is determined whether the parameter j is 23, in order to determine whether the parameter j indicates the last coded symbol. If the parameter j is not equal to 23, the parameter j is increased by 1 and then the above process is repeated. Otherwise, if the parameter j is equal to 23, the control flow proceeds to step 1112. That is, after completion of XORing on the 24 coded symbols, the control flow proceeds to the next step.

After step 1110, it is determined in step 1112 whether the second information bit a1 is '1'. If the second information bit a1 is '1', the punctured basis Walsh code W2' (=1001 0010 1001 0011 0011 0011) is XORed with the coded symbol sequence parameter code[ ] of length 24 in the symbol unit. Otherwise, if the second information bit a1 is not '1', the control flow skips to step 1114. After step 1112, it is determined in step 1114 whether the third information bit a2 is '1'. If the third information bit a2 is '1', the punctured basis Walsh code W4' (0111 0001 1000 1111 0000 1111) is XORed with the coded symbol sequence parameter code[ ] of length 24 in the symbol unit. Otherwise, if the third information bit a2 is not '1', the control flow skips to step 1116. After step 1114, it is determined in step 1116 whether the fourth information bit 3 is '1'. If the fourth information bit a3 is '1', the punctured basis Walsh code W8' (=0000 1111 1000 0000 0000 1111 1111) is XORed with the coded symbol sequence parameter code[ ] of length 24 in the symbol unit. Otherwise, if the fourth information bit a3 is not '1', the control flow skips to step 1118. After step 1116, it is determined in step 1118 whether the fifth information bit a4 is '1'. If the fifth information bit a4 is '1', the punctured basis Walsh code W16' (=0000 0000 0111 1111 1111 1111) is XORed with the coded symbol sequence parameter code[ ] of length 24 in the symbol unit.

After step 1118, it is determined in step 1120 whether the sixth information bit a5 is '1'. If the sixth information bit a5 is '1', the basis mask function M1' (=1100 0100 1111 0000 0111 0111) punctured according to a predetermined puncturing rule is XORed with the coded symbol sequence parameter code[ ] of length 24. Otherwise, if the information bit a5 is not '1', the control flow skips to step 1122. After step 1120, it is determined in step 1122 whether the seventh information bit a6 is '1'. If the information bit a6 is '1', the punctured basis mask function M2' (=0000 1101 0010 1101 1100 0111) is XORed with the coded symbol sequence parameter code[ ] of length 24. Otherwise, if the ninth information bit a6 is not '1', the control flow skips to step 1124. In step 1124, the coded symbols determined by XORing only the sequences corresponding to information bits 1's out of the 7 sequences W1', W2', W4', W8', W16', M1' and M2' of length 24 associated respectively with the 10 input information bits a0–a9 are stored in the parameter code[ ].

The (24, 7) encoder creates 128 codewords by puncturing $0^{th}$, $1^{st}$, $3^{rd}$, $7^{th}$, $10^{th}$, $13^{th}$, $15^{th}$ and $18^{th}$ symbols from all of the codewords, like the (24, 7) encoder described in the first embodiment. Next, a description of a decoder according to the second embodiment of the present invention will be made with reference to FIG. 9. As described in the first embodiment, the decoder does not require a zero-inserter 950, since the decoder is constructed to use 24 symbols.

Referring to FIG. 9, a received signal r(t) corresponding to a QMI symbol of length 24 having a value of +1/–1 is commonly input to 3 multipliers 901–903 and a correlation calculator 920. The received signal r(t) is a signal encoded by a given punctured Walsh code and a give punctured mask sequence in the encoder (FIG. 7B) of the transmitter. A mask generator 910 creates every possible mask function which can be created by the 3 basis masks, i.e., mask functions M1'–M3' of length 24 punctured according to a given puncturing rule, and provides the generated mask functions to multipliers 901–903, respectively. The multiplier 901 multiplies the received signal r(t) of length 24 by the mask function M1' output from the mask generator 910, and provides its output to a correlation calculator 921. The multiplier 902 multiplies the received signal r(t) by the mask function M2' output from the mask generator 910, and provides its output to a correlation calculator 922. The multiplier 903 multiplies the received signal r(t) by the mask function M3' output from the mask generator 910, and provides its output to a correlation calculator 923. That is, the multipliers 901–903 multiply the received signal r(t) by their associated mask functions M1'–M3' from the mask generator 910, and provide their outputs to the associated correlation calculators 921–923, respectively. By doing so, the received signal r(t) and the signals calculated by multiplying the received signal r(t) by the possible 3 mask functions, i.e., a total of 4 signals, are provided to the 4 correlation calculators 920–923, respectively.

If the transmitter has encoded the QMI bits using a predetermined mask function, any one of the outputs from the multipliers 901–903 will be a mask function-removed signal. Then, the correlation calculators 920–923 calculate 32 correlation values by correlating the received signal r(t) and the outputs of the multipliers 901–903 with 32 Walsh codes of length 24. The largest one of the calculated correlation values, an index of then-correlated Walsh code and an index of the correlation calculator are provided to a correlation comparator 940. Here, the index of the correlation calculator is equivalent to an index of the mask function indicating which mask function is multiplied by the received signal, for the signal input to the correlation calculator. However, the mask index '0'means that no mask is multiplied by the received signal. The correlation calculator 920 calculates correlation values by correlating the received signal r(t) with 32 orthogonal codes of length 24. Further, the correlation calculator 920 provides the correlation comparator 940 with the largest one of the calculated correlation values, an index of then correlated Walsh code and an index '0'of the correlation calculator 920. At the same time, the correlation calculator 921 also calculates 32 correlation values by correlating the received signal r(t) multiplied by the mask function M1' by the multiplier 901 with 32 Walsh codes of length 24. Further, the correlation calculator 921 provides the correlation comparator 940 with the largest one of the calculated correlation values, an index of then-calculated Walsh code and an index '1'of the correlation calculator 921. The correlation calculator 922 calculates 32 correlation values by correlating the received signal r(t) multiplied by the mask function M2' by the multiplier 902 with 32 Walsh codes of length 24. Further, the correlation calculator 922 provides the correlation comparator 940 with the largest one of the calculated correlation values, an index of then-calculated Walsh code and an index '2' of the correlation calculator 922.

The correlation comparator 940' then compares the 4 largest correlation values provided from the correlation calculators 920–923, and determines the largest one of them. After determining the largest correlation value, the correlation comparator 940 outputs QMI information bits transmitted from the transmitter according to the index of the Walsh code provided from the correlation calculator associated with the determined correlation value and an index (or an index of a mask function multiplied by the received signal r(t)) of the same correlation calculator.

The correlation comparator according to the second embodiment has the same operation as that of the correlation comparator according to the first embodiment. An operation of the correlation comparator according to the second embodiment will be described below with reference to FIG. 10.

Referring to FIG. 10, in step 1000, a frequency indicating index i is initialized to 1, and a maximum value, a Walsh code index and a mask index are all initialized to '0'. In step 1010, the correlation value, the Walsh code index for the correlation value and the mask index, output from the first correlation calculator 920, are stored as a first maximum value, a first Walsh code index and a first mask sequence index, respectively. Thereafter, in step 1020, the first maximum value is compared with a previously stored maximum value. If the first maximum value is larger than the previously stored maximum value, the procedure goes to step 1030. Otherwise, if the first maximum value is smaller than or equal to the previously stored maximum value, the procedure proceeds to step 1040. In step 1030, the first maximum value is designated as the maximum value, and the first Walsh code index and the first mask index are designated as the Walsh code index and the mask index, respectively. In step 1040, a count value set for the index parameter i is compared with the number '4' of the correlation calculators, in order to determine whether comparison has been completely performed on all of the 4 correlation values. If the frequency indicating index i is not equal to the number '4'of the correlation calculators in step 1040, the correlation comparator 940 increases the frequency indication index i by 1 in step 1060 and thereafter, returns to step 1010 to repeat the above-described process using the $i^{th}$ maximum value, the $i^{th}$ Walsh code index and the with mask index, output from the increased with correlation calculator. After the above process is repeatedly performed on the $4^{th}$ maximum value, the $4^{th}$ Walsh code index and the $4^{th}$ mask index, the frequency indicating index i becomes 4. Then, the procedure goes to step 1050. In step 1050, the correlation comparator 940 outputs decoded bits (QMI bits) associated with the Walsh code index and the mask index. The Walsh code index and the mask index corresponding to the decoded bits are the Walsh code index and the mask index corresponding to the largest one of the 4 correlation values provided from the 4 correlation calculators.

As described above, the novel CDMA mobile communication system using QMI bits according to the present invention can efficiently encode the QMI using an error correcting code.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for encoding 7 input bits into 24 symbols in a mobile communication system, comprising:

an encoder for encoding 7 input bits into 32 symbols using a Reed-Muller code-; and a puncturer for puncturing 8 symbols from the 32 symbols provided from the encoder according to a predefined puncturing pattern, and outputting 24 symbols;

wherein the predefined puncturing pattern is selected from the group of puncturing patterns given below,

{0, 1, 3, 7, 10, 13, 15, 18}

{0, 1, 3, 7, 10, 13, 15, 25}

{0, 4, 13, 18, 20, 25, 29, 31}

{0, 1, 3, 7, 10, 11, 13, 16}

{0, 3, 10, 11, 13, 15, 26, 31}.

2. The apparatus as claimed in claim 1, wherein the encoder comprises:

a basis orthogonal sequence generator for generating basis orthogonal sequences of length 32;

a basis mask sequence generator for generating basis mask sequences of length 32; and an operator for receiving the 7 input bits comprised of a first information part which is converted to an orthogonal sequence and a second information part which is converted to the mask sequence, and generating the 32 symbols by combining an orthogonal sequence selected among the basis orthogonal sequences by first information part and a mask sequence selected among the basis orthogonal sequences by the second information part.

3. The apparatus as claimed in claim 2, wherein the basis orthogonal sequences include a $1^{st}$ Walsh code, a $2^{nd}$ Walsh code, a $4^{th}$ Walsh code, an $8^{th}$ Walsh code and a $16^{th}$ Walsh code, selected from 32 orthogonal equences of length 32.

4. The apparatus as claimed in claim 2, wherein the basis mask sequences include a $1^{st}$ mask sequence of 0010 1000 0110 0011 1111 0000 0111 0111, and a $2^{nd}$ mask sequence of 0000 0001 1100 1101 0110 1101 1100 0111.

5. The apparatus as claimed in claim 2, wherein the operator comprises:

a plurality of first multipliers for multiplying the basis orthogonal sequences by the input bits corresponding to the first information part;

a plurality of second multipliers for multiplying the basis mask sequences by the input bits corresponding to the second information part; and an adder for generating the 32 symbols by adding outputs of the first and second multipliers.

6. The apparatus as claimed in claim 1, wherein the input bits, being used as a quality matching indicator, when transmitted along with a frame which a plurality of service frames are multiplexed into, indicate a data rate of the plurality of service frames.

7. An apparatus for encoding 7 input bits into 24 symbols in a mobile communication system, comprising:

an orthogonal sequence generator for creating first sequences of length 24 by performing puncturing on basis orthogonal codes of length 32 according to a predefined puncturing pattern;

a mask sequence generator for creating second sequences of length 24 by performing puncturing on basis mask sequences of length 32 according to the predefined puncturing pattern;

a plurality of multipliers for multiplying the first sequences and the second sequences by associated input bits; and an adder for outputting the 24 symbols by adding output sequences of the multipliers;

wherein the predefined puncturing pattern is selected from the group of puncturing patterns given below, {0, 1, 3, 7, 10, 13, 15, 18}
{0, 1, 3, 7, 10, 13, 15, 25}
{0, 4, 13, 18, 20, 25, 29, 31}
{0, 1, 3, 7, 10, 11, 13, 16}
{3, 10, 11, 13, 15, 26, 31}.

8. The apparatus as claimed in claim 7, wherein the basis orthogonal sequences include a $1^{st}$ Walsh code, a $2^{nd}$ Walsh code, a $4^{th}$ Walsh code, an $8^{th}$ Walsh code and a $16^{th}$ Walsh code, selected from 32 orthogonal sequences of length 32.

9. The apparatus as claimed in claim 7, wherein the basis mask sequences include a $1^{st}$ mask sequence of 0010 1000 0110 0011 1111 0000 0111 0111, and a $2^{nd}$ mask sequence of 0000 0001 1100 1101 0110 1101 1100 0111.

10. The apparatus as claimed in claim 7, wherein the input bits being used as a quality matching indicator, when transmitted along with a frame which a plurality of service frames are multiplexed into, indicate a data rate of the plurality of service frames.

11. An apparatus for encoding 7 input bits into 24 symbols in a mobile communication system, comprising:

a (32, 7) Reed-Muller encoder for encoding 7 input bits into 32 symbols using Walsh codes of length 32 and masks of length 32-; and a puncturer for puncturing 8 symbols from the 32 symbols according to a predefined puncturing pattern, and outputting 24 non-punctured symbols;

wherein the predefined puncturing pattern is selected from the group of puncturing patterns given below, {0, 1, 3, 7, 10, 13, 15, 18}
{0, 1, 3, 7, 10, 13, 15, 25}
{0, 4, 13, 18, 20, 25, 29, 31}
{0, 1, 3, 7, 10, 11, 13, 16}
{0, 3, 10, 11, 13, 15, 26, 31}.

12. An apparatus for encoding 7 input bits into 24 symbols in a mobile communication system, comprising:

a (24, 7) encoder for encoding 7 input bits into 24 symbols, using (i) Walsh codes of length 24 obtained by performing puncturing on Walsh codes of length 32 according to a predefined puncturing pattern and (ii) masks of length 24 obtained by performing puncturing on masks of length 32 according to the predefined puncturing pattern;

wherein the predefined puncturing pattern is selected from the group of puncturing patterns given below, {0, 1, 3, 7, 10, 13, 15, 18}
{0, 1, 3, 7, 10, 13, 15, 25}
{0, 4, 13, 18, 20, 25, 29, 31}
{0, 1, 3, 7, 10, 11, 13, 16}
{0, 3, 10, 11, 13, 15, 26, 31}.

13. A method for encoding 7 input bits into 24 symbols in a mobile communication system, comprising the steps of:

encoding 7 input bits into 32 symbols using a Reed-Muller code; and puncturing 8 symbols from the 32 symbols according to a predefined puncturing pattern, and outputting 24 symbols;

wherein the predefined puncturing pattern is selected from the group of puncturing patterns given below, {0, 1, 3, 7, 10, 13, 15, 18}
{0, 1, 3, 7, 10, 13, 15, 25}
{0, 4, 13, 18, 20, 25, 29, 31}
{0, 1, 3, 7, 10, 11, 13, 16}
{0, 3, 10, 11, 13, 15, 26, 31}.

14. The method as claimed in claim 13, wherein the input bits, when transmitted along with one frame combined with a plurality of service frames, indicate a data rate of the service frames.

15. The method as claimed in claim 13, wherein the encoding step comprises the steps of:

generating basis orthogonal sequences of length 32;
generating basis mask sequences of length 32; and
receiving the 7 input bits comprised of a first information part which is converted to an orthogonal sequence and a second information part which is converted to the mask sequence, and generating the 32 symbols by combining an orthogonal sequence selected among the basis orthogonal sequences by the first information part and a mask sequence selected among the basis orthogonal sequences by the second information part.

16. The method as claimed in claim 15, wherein the basis orthogonal sequences include a $1^{st}$ Walsh code, a $2^{nd}$ Walsh code, a $4^{th}$ Walsh code, an $8^{th}$ Walsh code and a $16^{th}$ Walsh code, selected from 32 orthogonal sequences of length 32.

17. The method as claimed in claim 15, wherein the basis mask sequences include a $1^{st}$ mask sequence of 0010 1000 0110 0011 1111 0000 0111 0111, and a $2^{nd}$ mask sequence of 0000 0001 1100 1101 0110 1101 1100 0111.

18. A method for encoding 7 input bits into 24 symbols in a mobile communication system, comprising the steps of:

creating first sequences of length 24 by performing puncturing on basis orthogonal codes of length 32 according to a predefined puncturing pattern;

creating second sequences of length 24 by performing puncturing on basis mask sequences of length 32 according to the predefined puncturing pattern;

multiplying the first sequences and the second sequences by associated input bits; and outputting the 24 symbols by adding the multiplied sequences;

wherein the predefined puncturing pattern is selected from the group of puncturing patterns given below, {0, 1, 3, 7, 10, 13, 15, 18}
{0, 1, 3, 7, 10, 13, 15, 25}
{0, 4, 13, 18, 20, 25, 29, 31}
{0, 1, 3, 7, 10, 11, 13, 16}
{0, 3, 10, 11, 13, 15, 26, 31}.

19. The method as claimed in claim 18, wherein the input bits being used as a quality matching indicator, when transmitted along with a frame which a plurality of service frames are multiplexed into, indicate a data rate of the plurality of service frames.

20. The method as claimed in claim 18, wherein the basis orthogonal sequences include a $1^{st}$ Walsh code, a $2^{nd}$ Walsh code, a $4^{th}$ Walsh code, an $8^{th}$ Walsh code and a $16^{th}$ Walsh code, selected from 32 orthogonal sequences of length 32.

21. The method as claimed in claim 18, wherein the basis mask sequences include a $1^{st}$ mask sequence of 0010 1000 0110 0011 1111 0000 0111 0111, and a $2^{nd}$ mask sequence of 0000 0001 1100 1101 0110 1101 1100 0111.

22. A method for encoding 7 input bits into 24 symbols in a mobile communication system, comprising:

outputting an orthogonal sequence selected among a plurality of orthogonal sequences of length 32 by first information bits of the input bits;

outputting a mask sequence selected by second information bits of the input bits, among a plurality of mask sequences of length 32 created using a Gold sequence such that a minimum distance by the sum of the orthogonal sequences is equal to or larger than 12;

outputting 32 symbols by adding the orthogonal sequence and the mask sequence; and puncturing 8 symbols from the 32 symbols according to a predefined puncturing pattern, and outputting 24 non-punctured symbols;

wherein the predefined puncturing pattern is selected from the group of puncturing patterns given below,

{0, 1, 3, 7, 10, 13, 15, 18}

{0, 1, 3, 7, 10, 13, 15, 25}

{0, 4, 13, 18, 20, 25, 29, 31}

{0, 1, 3, 7, 10, 11, 13, 16}

{0, 3, 10, 11, 13, 15, 26, 31}.

* * * * *